US008555864B2

(12) United States Patent
Nitzke et al.

(10) Patent No.: US 8,555,864 B2
(45) Date of Patent: Oct. 15, 2013

(54) INTERNAL COMBUSTION ENGINE WITH AN EXHAUST-GAS RECIRCULATION AND METHOD FOR OPERATING AN INTERNAL COMBUSTION ENGINE

(75) Inventors: Hans-Georg Nitzke, Wettmershagen (DE); Jörg Larink, Haren/Ems (DE); Jens Jeschke, Braunschweig (DE); Thomas Lang, Wolfsburg (DE); Jürgen Wendt, Wolfsburg (DE); Achim Freitag, Wolfenbüttel (DE); Jörn Müller, Sickte (DE); Axel Groenendijk, Gifhorn (DE); Lothar Nee, Wolfsburg (DE); Uwe Scher, Cremlingen/Destedt (DE); Werner Aberle, Leiferde (DE); Dieter Mannigel, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 13/300,905

(22) Filed: Nov. 21, 2011

(65) Prior Publication Data

US 2012/0060499 A1 Mar. 15, 2012

Related U.S. Application Data

(60) Division of application No. 12/466,708, filed on May 15, 2009, now Pat. No. 8,091,535, and a continuation of application No. PCT/EP2007/008606, filed on Oct. 4, 2007.

(30) Foreign Application Priority Data

Nov. 16, 2006 (DE) ........................ 10 2006 054 043

(51) Int. Cl.

| | |
|---|---|
| ***F02B 47/08*** | (2006.01) |
| ***F02M 25/07*** | (2006.01) |
| ***F02B 33/44*** | (2006.01) |

(52) U.S. Cl.

USPC .................................... 123/568.12; 60/605.2

(58) Field of Classification Search

USPC .......... 60/605.2; 123/568.12, 568.17, 568.18, 123/568.21–568.32, 568.16, 676

See application file for complete search history.

(56) References Cited

U.S. PATENT DOCUMENTS

| | | | | |
|---|---|---|---|---|
| 6,138,649 | A | 10/2000 | Khair et al. | |
| 6,850,833 | B1 | 2/2005 | Wang et al. | |
| 7,013,879 | B2 | 3/2006 | Brookshire et al. | |
| 7,587,892 | B2 | 9/2009 | Dye et al. | |
| 7,946,117 | B2 * | 5/2011 | Atkinson et al. | 60/605.2 |
| 2001/0029935 | A1 * | 10/2001 | Cook | 123/568.27 |
| 2002/0129800 | A1 | 9/2002 | Russell et al. | |
| 2002/0189598 | A1 | 12/2002 | Remmels et al. | |
| 2004/0006978 | A1 | 1/2004 | Beck et al. | |
| 2004/0050375 | A1 | 3/2004 | Arnold | |
| 2004/0065303 | A1 | 4/2004 | Russell et al. | |
| 2004/0093866 | A1 * | 5/2004 | Ishikawa | 60/605.2 |
| 2004/0221831 | A1 * | 11/2004 | Chmela et al. | 123/301 |
| 2006/0080028 | A1 | 4/2006 | Moser et al. | |
| 2006/0117750 | A1 | 6/2006 | Shahed et al. | |
| 2006/0162705 | A1 | 7/2006 | Grunwald et al. | |
| 2006/0225713 | A1 | 10/2006 | Kano et al. | |
| 2007/0056554 | A1 * | 3/2007 | Li et al. | 123/305 |
| 2007/0235010 | A1 | 10/2007 | Fluga et al. | |
| 2008/0060624 | A1 * | 3/2008 | Grandas | 123/568.12 |
| 2008/0282784 | A1 | 11/2008 | Friis-Knudsen | |

FOREIGN PATENT DOCUMENTS

| | | | |
|---|---|---|---|
| EP | 1114924 | A2 | 7/2001 |
| EP | 1270921 | A2 | 1/2003 |
| EP | 1420159 | A2 | 5/2004 |
| JP | 9133052 | A1 | 5/1997 |
| JP | 2004150319 | A | 5/2004 |
| JP | 2004156572 | A | 6/2004 |
| JP | 2006336547 | A | 12/2006 |
| WO | 2004007925 | A1 | 1/2004 |
| WO | 2004057167 | A1 | 7/2004 |

OTHER PUBLICATIONS

International Search Report (Form PCT/ISA/210) and Notification of Transmittal of the International Search Report and the Written Opinion of the International Searching Authority, or the Declaration (Form PCT/ISA/220) for International Application PCT/EP2007/008606, dated Feb. 29, 2008.
Written Opinion of the International Searching Authority (Form PCT/ISA/237) for International Application PCT/EP2007/008606, dated Feb. 29, 2008.
Search Report issued by the German Patent Office for German Patent Application DE 10 2006 054 043.3, dated May 3, 2007.

* cited by examiner

*Primary Examiner* — Stephen K Cronin
*Assistant Examiner* — Sizo Vilakazi
(74) *Attorney, Agent, or Firm* — Manfred Beck, P.A.

(57) ABSTRACT

An internal combustion engine has a high-pressure exhaust-gas recirculation line and a low-pressure exhaust-gas recirculation line with a low-pressure exhaust-gas recirculation valve. The low-pressure exhaust-gas recirculation line branches off from the exhaust-gas system downstream of a turbine of an exhaust-gas turbocharger and opens into a fresh-air system upstream of a compressor of the exhaust-gas turbocharger. An exhaust-gas flap is disposed in the exhaust-gas system downstream from where the low-pressure exhaust-gas recirculation line branches off from the exhaust-gas system. At least one pressure sensor is disposed in the low-pressure exhaust-gas recirculation line and configured such that the at least one pressure sensor determines a pressure difference in the low-pressure exhaust-gas recirculation line between a point upstream of the low-pressure exhaust-gas recirculation valve and a point downstream of the low-pressure exhaust-gas recirculation valve. A method for operating an internal combustion engine is also provided.

21 Claims, 1 Drawing Sheet

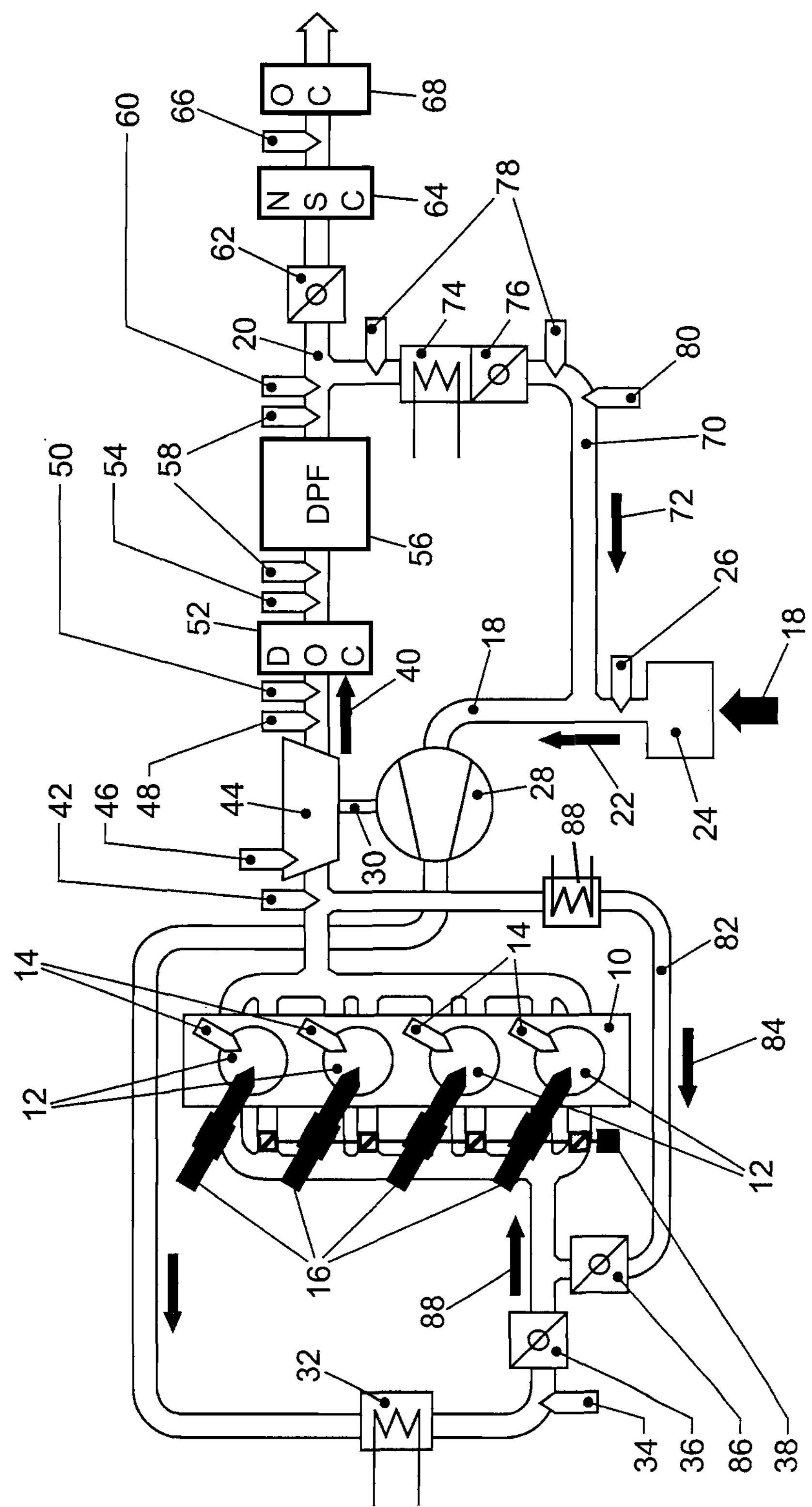
DPF
DOC
NSC
OC
10
12
14
16
18
20
22
24
26
28
30
32
34
36
38
40
42
44
46
48
50
52
54
56
58
60
62
64
66
68
70
72
74
76
78
80
82
84
86
88

INTERNAL COMBUSTION ENGINE WITH AN EXHAUST-GAS RECIRCULATION AND METHOD FOR OPERATING AN INTERNAL COMBUSTION ENGINE

CROSS-REFERENCE TO RELATED APPLICATIONS

This application is a divisional of and claims priority to U.S. application Ser. No. 12/466,708, filed May 15, 2009, which is a continuation, under 35 U.S.C. §120, of copending International Application No. PCT/EP2007/008606, filed Oct. 4, 2007, which designated the United States; this application also claims the priority, under 35 U.S.C. §119, of German Patent Application No. DE 10 2006 054 043.3, filed Nov. 16, 2006; the prior applications are herewith incorporated by reference in their entirety.

BACKGROUND OF THE INVENTION

Field of the Invention

The invention relates to an internal combustion engine, in particular a diesel engine or an otto-cycle engine, with a fresh-air system in which a charge-air cooler is disposed, an exhaust-gas system, an exhaust-gas turbocharger which has a compressor disposed in the fresh-air system upstream of the charge-air cooler and a turbine disposed in the exhaust-gas system, a first line for a high-pressure exhaust-gas recirculation which, upstream of the turbine of the exhaust-gas turbocharger, branches off from the exhaust-gas system and which has a high-pressure exhaust-gas recirculation valve and which, downstream of the charge-air cooler, opens into the fresh-air system, a second line for a low-pressure exhaust-gas recirculation which, downstream of the turbine of the exhaust-gas turbocharger, branches off from the exhaust-gas system and which has a low-pressure exhaust-gas recirculation valve and which, upstream of the compressor of the exhaust-gas turbocharger, opens into the fresh-air system, and an exhaust-gas flap disposed in the exhaust-gas system downstream of the branch-off of the low-pressure exhaust-gas recirculation line. The invention also relates to a method for operating an internal combustion engine, particularly a diesel engine or an otto-cycle engine, the internal combustion engine having a fresh-air system, an exhaust-gas system, an exhaust-gas turbocharger, which has a compressor disposed in the fresh-air system and a turbine disposed in the exhaust-gas system, wherein recirculated exhaust-gas is diverted from the exhaust-gas system downstream of the turbine of the exhaust-gas turbocharger, via a line for a low-pressure exhaust-gas recirculation, by using a low-pressure exhaust-gas recirculation valve and is fed, upstream of the compressor of the exhaust-gas turbocharger, as a low-pressure exhaust-gas recirculation mass flow into the fresh-air system, wherein an exhaust-gas flap is disposed downstream of the branch-off of the low-pressure exhaust-gas recirculation line.

Japanese Patent Application JP 2004150319 A discloses a diesel combustion engine with a high-pressure exhaust-gas recirculation path (HP-EGR path) and a low-pressure exhaust-gas recirculation path (LP-EGR path), wherein an exhaust-gas flap is provided at the junction where the LP-EGR path branches off from an exhaust-gas line of the diesel combustion engine. The LP-EGR mass flow is extracted downstream of a turbine of an exhaust-gas turbocharger (EGT) on the low pressure side after a device for an exhaust-gas aftertreatment and is fed into the intake air in front of a compressor of the exhaust-gas turbocharger. The low-pressure exhaust-gas recirculation mass flow is cooled down on the way to the compressor inlet. A low-pressure exhaust-gas recirculation valve is provided upstream of the entry of the low-pressure exhaust-gas recirculation mass flow into the fresh air. The low-pressure exhaust-gas recirculation path is used at low and medium rotational speeds and in the middle load range, i.e. when there is a sufficient pressure drop.

Japanese Patent Application JP 2004156572 A discloses a diesel engine which has a high-pressure exhaust-gas recirculation path (HP-EGR path) with a high-pressure exhaust-gas recirculation valve and a low-pressure exhaust-gas recirculation path (LP-EGR path). The low-pressure exhaust-gas recirculation path branches off downstream of a turbine of an exhaust-gas turbocharger (EGT) as well as after an exhaust-gas aftertreatment device and opens into the fresh-air path upstream of a compressor of the exhaust-gas turbocharger. An exhaust-gas flap controls the amount of the low-pressure exhaust-gas recirculation mass flow in accordance with an operating state of the diesel engine.

U.S. Pat. No. 7,013,879 B2 discloses a low-pressure exhaust-gas recirculation path (LP-EGR path) for an internal combustion engine, wherein the LP-EGR path branches off downstream of the turbine of an exhaust-gas turbocharger as well as a particulate filter and, via an EGR cooler as well as a control valve, opens into the fresh-air line directly upstream of the compressor of the exhaust-gas turbocharger.

SUMMARY OF THE INVENTION

It is accordingly an object of the invention to provide an internal combustion engine and a method for operating an internal combustion engine which have an improved exhaust-gas processing and exhaust-gas aftertreatment.

With the foregoing and other objects in view there is provided, in accordance with the invention, an internal combustion engine, including:

a fresh-air system;

a charge-air cooler disposed in the fresh-air system;

an exhaust-gas system;

an exhaust-gas turbocharger having a compressor and a turbine, the compressor being disposed, upstream of the charge-air cooler, in the fresh-air system, the turbine being disposed in the exhaust-gas system;

a high-pressure exhaust-gas recirculation line branching off from the exhaust-gas system upstream of the turbine of the exhaust-gas turbocharger, the high-pressure exhaust-gas recirculation line having a high-pressure exhaust-gas recirculation valve, the high-pressure exhaust-gas recirculation line opening into the fresh-air system downstream of the charge-air cooler;

a low-pressure exhaust-gas recirculation line branching off from the exhaust-gas system downstream of the turbine of the exhaust-gas turbocharger, the low-pressure exhaust-gas recirculation line having a low-pressure exhaust-gas recirculation valve, the low-pressure exhaust-gas recirculation line opening into the fresh-air system upstream of the compressor of the exhaust-gas turbocharger;

an exhaust-gas flap disposed in the exhaust-gas system downstream from where the low-pressure exhaust-gas recirculation line branches off from the exhaust-gas system; and at least one pressure sensor disposed in the low-pressure exhaust-gas recirculation line and configured such that the at least one pressure sensor determines a pressure difference in the low-pressure exhaust-gas recirculation line between a point upstream of the low-pressure exhaust-gas recirculation valve and a point downstream of the low-pressure exhaust-gas recirculation valve.

According to another feature of the invention, the at least one pressure sensor includes a differential pressure sensor. According to a further feature of the invention, an exhaust-gas recirculation cooler is disposed in the high-pressure exhaust-gas recirculation line. According to yet another feature of the invention, a particulate filter is disposed in the exhaust-gas system downstream of the turbine of the exhaust-gas turbocharger.

According to another feature of the invention, the low-pressure exhaust-gas recirculation line branches off from the exhaust-gas system downstream of the particulate filter. According to a further feature of the invention, an exhaust-gas recirculation cooler is disposed in the low-pressure exhaust-gas recirculation line.

According to another feature of the invention, the at least one pressure sensor includes an absolute pressure sensor disposed in flow direction in front of the exhaust-gas recirculation cooler. According to another feature of the invention, the exhaust-gas recirculation cooler is disposed upstream of the low-pressure exhaust-gas recirculation valve.

According to another feature of the invention, a temperature sensor is disposed in the low-pressure exhaust-gas recirculation line downstream of the low-pressure exhaust-gas recirculation valve. According to another feature of the invention, a temperature sensor is disposed in the exhaust-gas system upstream of the turbine of the exhaust-gas turbocharger. According to a further feature of the invention, the internal combustion engine is a diesel engine or an otto-cycle engine.

In other words, according to the invention, there is provided an internal combustion engine, in particular a diesel engine or an otto-cycle engine, with a fresh-air system in which a charge-air cooler is disposed, an exhaust-gas system, an exhaust-gas turbocharger which has a compressor disposed in the fresh-air system upstream of the charge-air cooler and a turbine disposed in the exhaust-gas system, a first line for a high-pressure exhaust-gas recirculation which, upstream of the turbine of the exhaust-gas turbocharger, branches off from the exhaust-gas system and which has a high-pressure exhaust-gas recirculation valve and which, downstream of the charge-air cooler, opens into the fresh-air system, a second line for a low-pressure exhaust-gas recirculation which, downstream of the turbine of the exhaust-gas turbocharger, branches off from the exhaust-gas system and which has a low-pressure exhaust-gas recirculation valve and which, upstream of the compressor of the exhaust-gas turbocharger, opens into the fresh-air system, and an exhaust-gas flap disposed in the exhaust-gas system downstream of the branch-off of the low-pressure exhaust-gas recirculation line, wherein, in the low-pressure exhaust-gas recirculation line, at least one pressure sensor is disposed and configured such that it determines a pressure difference in the low-pressure exhaust-gas recirculation line between a point upstream and a point downstream of the low-pressure exhaust-gas recirculation valve.

Providing the pressure sensor in the above-defined manner, has the advantage that a real low-pressure exhaust-gas recirculation mass flow can be determined, which can be used as a base value for controlling the exhaust-gas flap and the low-pressure exhaust-gas recirculation valve (LP-EGR valve). The pressure sensor includes for example a differential pressure sensor.

An exhaust-gas recirculation cooler (EGR cooler) is expediently disposed in the high-pressure exhaust-gas recirculation line and a particulate filter is expediently disposed in the exhaust-gas system downstream of the turbine of the exhaust-gas turbocharger, wherein the low-pressure exhaust-gas recirculation line branches off from the exhaust-gas system at a point downstream of the particulate filter.

In order to protect the compressor from an excessive thermal load and in order to be able to compress the mixture of exhaust-gas and fresh air sufficiently highly, an exhaust-gas recirculation cooler (EGR cooler) is disposed in the low-pressure exhaust-gas recirculation line (LP-EGR line). The EGR cooler is preferably disposed upstream of the EGR valve.

In accordance with a preferred embodiment, the pressure sensor includes an absolute pressure sensor which is disposed in flow direction in front of the EGR cooler. A temperature sensor is disposed downstream of the LP-EGR valve in the LP-EGR line for the purpose of monitoring possible on-board diagnostic (OBD) requirements. A temperature sensor is expediently disposed in the exhaust-gas system upstream of the turbine.

With the objects of the invention in view there is also provided, a method for operating a combustion engine that includes the following steps:

providing an internal combustion engine including a fresh-air system, an exhaust-gas system, an exhaust-gas turbocharger with a compressor disposed in the fresh-air system and a turbine disposed in the exhaust-gas system and providing an exhaust-gas flap downstream from where a low-pressure exhaust-gas recirculation line branches off from the exhaust-gas system;

diverting, via the low-pressure exhaust-gas recirculation line, recirculated exhaust-gas from the exhaust-gas system downstream of the turbine of the exhaust-gas turbocharger by using a low-pressure exhaust-gas recirculation valve and feeding recirculated exhaust-gas upstream of the compressor of the exhaust-gas turbocharger as a low-pressure exhaust-gas recirculation mass flow into the fresh-air system; and opening the exhaust-gas flap and controlling a volume flow through the low-pressure exhaust-gas recirculation line exclusively with the low-pressure exhaust-gas recirculation valve as long as a pressure drop across the low-pressure exhaust-gas recirculation valve exceeds a given value and additionally actuating the exhaust-gas flap in a direction of closing in case the pressure drop across the low-pressure exhaust-gas recirculation valve falls below the given value in order to control the volume flow through the low-pressure exhaust-gas recirculation line.

Another mode of the method of the invention includes diverting the recirculated exhaust-gas from the exhaust-gas system downstream of a particulate filter. A further mode of the method of the invention includes diverting, via a high-pressure exhaust-gas recirculation line, recirculated exhaust-gas from the exhaust-gas system upstream of the turbine of the exhaust-gas turbocharger by using a high-pressure exhaust-gas recirculation valve and feeding recirculated exhaust-gas downstream of the compressor of the exhaust-gas turbocharger as a high-pressure exhaust-gas recirculation mass flow into the fresh-air system.

Another mode of the method of the invention includes feeding the high-pressure exhaust-gas recirculation mass flow downstream of a charge-air cooler into the fresh-air system. A further mode of the method of the invention includes cooling the high-pressure exhaust-gas recirculation mass flow prior to feeding the high-pressure exhaust-gas recirculation mass flow into the fresh-air system.

Another mode of the method of the invention includes measuring a pressure difference across the low-pressure exhaust-gas recirculation valve; and actuating the low-pressure exhaust-gas recirculation valve and/or the exhaust-gas flap in dependence of the pressure difference across the low-pressure exhaust-gas recirculation valve. Another mode of the method of the invention includes measuring a temperature of the low-pressure exhaust-gas recirculation mass flow downstream of the low-pressure exhaust-gas recirculation valve.

Another mode of the method of the invention includes calculating a low-pressure exhaust-gas mass flow by using an ascertained differential pressure across the low-pressure exhaust-gas recirculation valve; and determining, from the low-pressure exhaust-gas mass flow, a volume flow through a particulate filter disposed in the exhaust-gas system. Another mode of the method of the invention includes determining, from the volume flow through the particulate filter, a loading of the particulate filter.

Another mode of the method of the invention includes cooling the low-pressure exhaust-gas recirculation mass flow prior to feeding the low-pressure exhaust-gas recirculation mass flow into the fresh-air system. Another mode of the method of the invention includes using, as the internal combustion engine, a diesel engine or an otto-cycle engine.

In other words, according to the invention, there is provided a method for operating an internal combustion engine, particularly a diesel engine or an otto-cycle engine, which is in particular embodied in accordance with at least one of the above-defined configurations, the internal combustion engine having a fresh-air system, an exhaust-gas system, an exhaust-gas turbocharger (EGT), which has a compressor disposed in the fresh-air system and a turbine disposed in the exhaust-gas system, wherein recirculated exhaust-gas is diverted from the exhaust-gas system downstream of the turbine of the exhaust-gas turbocharger, via a line for a low-pressure exhaust-gas recirculation (LP-EGR), by using a low-pressure exhaust-gas recirculation valve, and is fed, upstream of the compressor of the exhaust-gas turbocharger, as a low-pressure exhaust-gas recirculation mass flow into the fresh-air system, wherein an exhaust-gas flap is disposed downstream of the branch-off of the low-pressure exhaust-gas recirculation line, wherein the exhaust-gas flap is open and the volume flow via the LP-EGR line is controlled exclusively through the use of the low-pressure exhaust-gas recirculation valve as long as a pressure drop across the low-pressure exhaust-gas recirculation valve exceeds a predetermined value and wherein, when it falls below the predetermined value, the exhaust-gas flap is actuated in addition in a closing direction in order to control the volume flow via the low-pressure exhaust-gas recirculation line.

The above-defined method has the advantage that a very good mixing of the recirculated exhaust-gas and the fresh air is achieved, wherein the recirculated exhaust-gas is practically non-pulsating. A particularly clean recirculated exhaust-gas is achieved by diverting the recirculated exhaust-gas downstream of a particulate filter.

A further reduction of pollutants in the exhaust-gas is achieved by diverting recirculated exhaust-gas from the exhaust-gas system via a line for a high-pressure exhaust-gas recirculation (HP-EGR) with a HP-EGR valve upstream of the turbine of the exhaust-gas turbocharger and feeding it downstream of the compressor of the exhaust-gas turbocharger as a high-pressure exhaust-gas recirculation (HP-EGR) mass flow into the fresh-air system.

The high-pressure exhaust-gas recirculation (HP-EGR) mass flow is expediently fed into the fresh-air system downstream of a charge-air cooler. It is furthermore advantageous to cool the HP-EGR mass flow prior to feeding it into the fresh-air system. In order to accurately control the low-pressure exhaust-gas recirculation mass flow, a pressure difference across the low-pressure exhaust-gas recirculation valve is measured and the low-pressure exhaust-gas recirculation valve and/or the exhaust-gas flap are actuated in dependence of this pressure difference.

A temperature of the low-pressure exhaust-gas recirculation mass flow is measured downstream of the low-pressure exhaust-gas recirculation valve in order to monitor possible on-board diagnostic requirements. It is expedient to calculate the low-pressure exhaust-gas mass flow from an ascertained differential pressure across the low-pressure exhaust-gas recirculation valve and to determine a volume flow through a particulate filter disposed in the exhaust-gas system from this low-pressure exhaust-gas mass flow. Furthermore a loading of the particulate filter is then determined from the volume flow through the particulate filter. In order to protect the compressor from excessive thermal stress and in order to be able to compress the mixture of exhaust-gas and fresh air sufficiently highly, the low-pressure exhaust-gas recirculation mass flow is cooled before introducing it into the fresh-air system.

Other features which are considered as characteristic for the invention are set forth in the appended claims.

Although the invention is illustrated and described herein as embodied in an internal combustion engine and a method for operating an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE is a schematic view of a preferred embodiment of an internal combustion engine according to the invention.

DESCRIPTION OF THE PREFERRED EMBODIMENTS

Referring now to the single FIGURE, there is shown a preferred embodiment of an internal combustion engine according to the invention in the form of a diesel combustion engine. The diesel combustion engine includes an engine block 10 with working cylinders 12, wherein each working cylinder 12 has a cylinder pressure sensor 14 and a common rail injector 16 assigned thereto. A fresh-air system 18 supplies fresh air as combustion air to the working cylinders 12 and an exhaust-gas system 20 discharges exhaust-gas from the working cylinders 12.

The following elements are provided in the fresh-air system 18, when viewed in the flow direction of the fresh air 22: An air filter 24, an air flow meter 26 (HFM=hot-film air-mass meter), a compressor 28 of an exhaust-gas turbocharger (EGT) 30, a charge-air cooler 32, a duo-sensor 34, which measures a temperature $T_2$ as well as a pressure $p_2$, a control flap 36, and a controlled intake manifold runner 38.

The following elements are provided in the exhaust-gas system 20 starting from the engine block 10, when viewed in the flow direction of the exhaust-gas 40: A first temperature sensor 42, which measures a temperature $T_3$, a turbine 44 of the exhaust-gas turbocharger 30, a displacement sensor 46 disposed at the turbine 44, a first Lambda oxygen sensor 48, a second temperature sensor 50, which measures a temperature $T_4$, an oxidation catalytic converter (DOC=diesel oxidation catalytic converter) 52, a third temperature sensor 54, which measures a temperature T*, a diesel particulate filter (DPF) 56, a first differential pressure sensor 58, which determines a pressure drop across the diesel particulate filter (DPF) 56, a fourth temperature sensor 60, which determines a temperature $T_4'$, an exhaust-gas flap 62, an $NO_x$ storage catalytic converter 64, a second Lambda oxygen sensor 66 and an $H_2S$ trap catalytic converter (OC) 68.

Downstream of the diesel particulate filter 56, i.e. on a low-pressure side of the exhaust-gas system 20, a low-pressure exhaust-gas recirculation line (LP-EGR line) 70 branches off from the exhaust-gas system 20, the LP-EGR line 70 merging back into the fresh-air system 18 upstream of the compressor 28 and downstream of the air filter 24 or the air-mass meter (HFM) 26. In the low-pressure exhaust-gas recirculation line (LP-EGR line) 70, the following elements are provided, when viewed in the flow direction of an LP-EGR mass flow 72, starting at the branch-off from the exhaust-gas system 20: An EGR cooler 74, a LP-EGR valve 76, a second differential pressure sensor 78, which determines a pressure drop across the EGR cooler 74 and the LP-EGR valve 76, a fifth temperature sensor 80, which determines a temperature $T_{LP\ EGR}$ of the LP-EGR mass flow 72.

The cooling of the LP-EGR mass flow can optionally be performed by omitting the EGR cooler 74 and utilizing the lengths of the lines or utilizing the geometries or shapes of the lines or pipes.

Upstream of the turbine 44 of the exhaust-gas turbocharger 30, i.e. on a high-pressure side of the exhaust-gas system 20, a high-pressure exhaust-gas recirculation line (HP-EGR line) 82 branches off from the exhaust-gas system 20, which high-pressure exhaust-gas recirculation line 82 opens into the fresh-air system 18 downstream of the control flap 36 and upstream of the controlled intake manifold runner. Through the use of this high-pressure exhaust-gas recirculation line (HP-EGR line) 82, an HP-EGR mass flow 84 is fed, via an HP-EGR valve 86, into the fresh-air system 18. An EGR cooler 88 is shown in the HP-EGR line 82 of the embodiment shown in the FIGURE, however, in accordance with an alternative embodiment, the EGR cooler 88 in the HP-EGR line 82 may be omitted. A cooling of the HP-EGR mass flow 84 can optionally be carried out through the use of either the length of line of the HP-EGR line 82 or through the use of the EGR cooler 88, which is provided in the HP-EGR line 82 and which can be structurally and/or functionally combined with the EGR cooler 74 of the LP-EGR path.

The internal combustion engine shown in the figure therefore has an exhaust-gas recirculation (EGR) in which, upstream of the turbine 44 as well as downstream of the diesel particulate filter 56, exhaust-gas is extracted from the exhaust-gas system 20 and, after being cooled, is fed into the fresh-air system 18 upstream of the compressor 28 as well as downstream of the charge-air cooler 32. The control of the EGR amount, i.e. the recirculated exhaust-gas mass flow, is carried out through the use of the exhaust-gas flap 62 and the EGR valves 76 and 86. The internal combustion engine can alternatively be operated without an exhaust-gas recirculation, with a high-pressure exhaust-gas recirculation (HP-EGR) or low-pressure exhaust-gas recirculation (LP-EGR) or simultaneously with a high-pressure exhaust-gas recirculation (HP-EGR) and a low-pressure exhaust-gas recirculation (LP-EGR). Altogether, this achieves a clean EGR mass flow 72 and 84, an improved cooling of the EGR mass flow 72 and, respectively, 84, no soot accumulation in the EGR cooler, a good mixing of the EGR mass flow 72 and, respectively, 84 and the fresh air 88 in the fresh-air system. High EGR rates are possible and a partly homogeneous operation of the internal combustion engine is possible.

With the help of the exhaust-gas flap 62 and the LP-EGR valve 76 in front of the compressor 28, the recirculated LP-EGR mass flow 72 is fed to the fresh air 88 between the air-mass meter 26 and the compressor 28. In this case, the operation is initially performed only by the LP-EGR valve 76, as long as a sufficient pressure drop, i.e. difference in pressure, is available for the delivery of the LP-EGR mass flow 72. If this is no longer the case, the exhaust-gas flap 62 is adjusted to increase its pitch to some extent, in order to increase the pressure drop across the LP-EGR valve 76. A very good mixing of the LP-EGR mass flow 72 with the fresh air 88 is ensured. A further advantage among others is that the recirculated exhaust-gas 72 is clean and almost non-pulsating. In addition, an increased compressor capacity is available since during the LP-EGR operation the entire exhaust-gas 40 is conducted through the turbine and not, as is the case in a conventional setup only a partial flow which is not recirculated. Since the recirculated exhaust-gas 72 after the compressor 28 is conducted through the high-capacity charge-air cooler 32, the exhaust-gas/air mixture is also relatively cold. The engine can be operated depending on need, both with the HP-EGR path 82 and with the LP-EGR path 70. A number of sensors and actuators are needed for the operation of the engine whose functions are explained hereinafter.

The EGR system of the internal combustion engine according to the invention includes among others the following components:

1. Exhaust-gas flap 62 (electric, position control in the engine control unit)

In the LP-EGR path 70:

2. EGR valve 76 (electric with position feedback, position control by the engine control unit)

3. EGR cooler 74

4. Differential pressure sensor device 78, alternatively absolute pressure in front of the EGR cooler 74 (in flow direction)

5. EGR temperature sensor 80 $T_{LP\text{-}EGR}$, optional for implementing the OBD (On-Board Diagnostics) requirements in NAR (North America Region)

The EGR cooler makes sure that no inadmissibly high temperatures occur at the compressor 28 during the EGR operation. The differential pressure sensor 78 serves for acquiring the exhaust-gas volume flow through the LP-EGR path 70. This volume flow is used for a volume flow calculation across the diesel particulate filter 56 and thus for determining the loading. This volume flow furthermore serves as an actual quantity of the exhaust-gas rate for the exhaust-gas rate control. The temperature sensor 80 has two tasks: It serves for diagnostic purposes (efficiency monitoring of the cooler) as well as for switching off the EGR in case of an imminent excess temperature of the compressor 28. The EGR cooler 74 can be dimensioned such that it is smaller than it would be without this temperature sensor 80.

The exhaust-gas flap 62 and the LP-EGR valve 76 are the actuating elements of the EGR regulation. Both, the LP-EGR valve and the exhaust-gas flap can be adjusted in a continuous manner. In principle, one distinguishes between two different operating modes:

1. Normal Operation (Driving Operation with Exhaust-Gas Recirculation):

The fresh-air mass 88 is controlled in a usual manner. The actual value of the fresh-air mass 88 is measured with the HFM 26 and is compared with a setpoint value in a control unit. The control flap 36 is completely open. The HP-EGR valve 86 is in this case controlled. The control variable (manipulated variable) of the controller operates on the LP-EGR valve 76 in case of small control variables and the exhaust-gas flap 62 remains open for an optimal efficiency. Only if the LP-EGR valve 76 is wide open and the differential pressure across this valve 76 is too low, is the exhaust-gas flap 62 used as a control variable of the controller, wherein the exhaust-gas flap 62 is then adjusted with respect to its pitch, such that the differential pressure across the LP-EGR valve 76 increases again. The latter is the case in most operating points. The transition is continuous.

2. Exhaust-Gas Aftertreatment (Driving Operation with Regeneration Measures):

As exhaust-gas aftertreatment measures it is necessary to regenerate the diesel particulate filter 56 as well as the $NO_x$ storage catalytic converter (NSC) 64. The fresh-air mass 88 is controlled with the help of the control flap 36. The exhaust-gas recirculation rate detected through the use of the second differential pressure sensor 78 is controlled (second control loop) independently from this.

In this case too, just like before, first the LP-EGR valve 76 is opened and then the exhaust-gas flap 62 is further closed if required. The $NO_x$ storage catalytic converter regeneration is performed in a common manner by enriching the fuel air mixture ($\lambda<1$) wherein a combination of a throttling across the exhaust-gas flap 62 and an increased LP-EGR rate is used.

The regeneration of the diesel particulate filter 56 is not achieved by enriching the fuel air mixture but by increased exhaust-gas temperatures, for example by additional injections.

In both cases an optimal operating point with respect to the efficiency is guaranteed since the LP-EGR valve 76 is always opened first and only then is the exhaust-gas flap 62 closed. Thus the throttling losses are minimized.

The HP-EGR path 82 is provided because the cooling effect of the charge-air cooler 32 during warming up is too large, such that the HC emissions would rise too sharply. This also improves the dynamics, primarily when starting from a vehicle standstill. The exhaust-gas volume that is present within the entire EGR path (including the charge-air cooler), must first be replaced by fresh air when driving off from a standstill (or in case of a large torque request). A cooling of the HP-EGR mass flow 84 is not absolutely necessary; an EGR cooler can nevertheless be optionally provided in the HP-EGR path 82.

The low-pressure exhaust-gas recirculation is especially advantageous in connection with the $NO_x$ storage catalytic converter 64. The possibility to regenerate the catalytic converter 64 ($DeNO_x$ as well as $DeSO_x$) is limited by the maximum allowable component temperatures. The limitation is primarily determined by the turbine temperature of the exhaust-gas turbocharger 30. These temperatures can be lowered effectively during the regeneration with the help of the LP-EGR path 70 so that the possible operating range of the catalytic converter is extended towards substantially higher loads when compared to pure HP-EGR systems.

What is claimed is:

1. A method for operating a combustion engine, the method which comprises:

providing an internal combustion engine including a fresh-air system, an exhaust-gas system, an exhaust-gas turbocharger with a compressor disposed in the fresh-air system and a turbine disposed in the exhaust-gas system;

providing an exhaust-gas recirculation cooler in a low-pressure exhaust-gas recirculation line;

providing a pressure sensor in the low-pressure exhaust-gas recirculation line in flow direction in front of the exhaust-gas recirculation cooler, the pressure sensor including an absolute pressure sensor;

diverting, via the low-pressure exhaust-gas recirculation line, recirculated exhaust-gas from the exhaust-gas system downstream of the turbine of the exhaust-gas turbocharger by using a low-pressure exhaust-gas recirculation valve and feeding recirculated exhaust-gas upstream of the compressor of the exhaust-gas turbocharger as a low-pressure exhaust-gas recirculation mass flow into the fresh-air system;

providing an exhaust-gas flap in the exhaust-gas system downstream from where the low-pressure exhaust-gas recirculation line branches off from the exhaust-gas system; and opening the exhaust-gas flap and controlling a volume flow through the low-pressure exhaust-gas recirculation line exclusively with the low-pressure exhaust-gas recirculation valve as long as a pressure drop across the low-pressure exhaust-gas recirculation valve exceeds a given value and additionally actuating the exhaust-gas flap in a direction of closing in case the pressure drop across the low-pressure exhaust-gas recirculation valve falls below the given value in order to control the volume flow through the low-pressure exhaust-gas recirculation line.

2. The method according to claim 1, which comprises diverting the recirculated exhaust-gas from the exhaust-gas system downstream of a particulate filter.

3. The method according to claim 1, which comprises diverting, via a high-pressure exhaust-gas recirculation line, recirculated exhaust-gas from the exhaust-gas system upstream of the turbine of the exhaust-gas turbocharger by using a high-pressure exhaust-gas recirculation valve and feeding recirculated exhaust-gas downstream of the compressor of the exhaust-gas turbocharger as a high-pressure exhaust-gas recirculation mass flow into the fresh-air system.

4. The method according to claim 3, which comprises feeding the high-pressure exhaust-gas recirculation mass flow downstream of a charge-air cooler into the fresh-air system.

5. The method according to claim 3, which comprises cooling the high-pressure exhaust-gas recirculation mass flow prior to feeding the high-pressure exhaust-gas recirculation mass flow into the fresh-air system.

6. The method according to claim 1, which comprises measuring a temperature of the low-pressure exhaust-gas recirculation mass flow downstream of the low-pressure exhaust-gas recirculation valve.

7. The method according to claim 1, which comprises:

calculating a low-pressure exhaust-gas mass flow by using absolute pressure ascertained by the absolute pressure sensor; and determining, from the low-pressure exhaust-gas mass flow, a volume flow through a particulate filter disposed in the exhaust-gas system.

8. The method according to claim 7, which comprises determining, from the volume flow through the particulate filter, a loading of the particulate filter.

9. The method according to claim 1, which comprises cooling the low-pressure exhaust-gas recirculation mass flow prior to feeding the low-pressure exhaust-gas recirculation mass flow into the fresh-air system.

10. The method according to claim 1, which comprises using, as the internal combustion engine, one of a diesel engine and an otto-cycle engine.

11. A method for operating a combustion engine, the method which comprises:

providing an internal combustion engine including a fresh-air system, an exhaust-gas system, an exhaust-gas turbocharger with a compressor disposed in the fresh-air system and a turbine disposed in the exhaust-gas system and providing an exhaust-gas flap downstream from where a low-pressure exhaust-gas recirculation line branches off from the exhaust-gas system;

diverting, via the low-pressure exhaust-gas recirculation line, recirculated exhaust-gas from the exhaust-gas system downstream of the turbine of the exhaust-gas turbocharger by using a low-pressure exhaust-gas recirculation valve and feeding recirculated exhaust-gas upstream of the compressor of the exhaust-gas turbocharger as a low-pressure exhaust-gas recirculation mass flow into the fresh-air system; and opening the exhaust-gas flap and controlling a volume flow through the low-pressure exhaust-gas recirculation line exclusively with the low-pressure exhaust-gas recirculation valve as long as a pressure drop across the low-pressure exhaust-gas recirculation valve exceeds a given value and additionally actuating the exhaust-gas flap in a direction of closing in case the pressure drop across the low-pressure exhaust-gas recirculation valve falls below the given value in order to control the volume flow through the low-pressure exhaust-gas recirculation line.

12. The method according to claim 11, which comprises diverting the recirculated exhaust-gas from the exhaust-gas system downstream of a particulate filter.

13. The method according to claim 11, which comprises diverting, via a high-pressure exhaust-gas recirculation line, recirculated exhaust-gas from the exhaust-gas system upstream of the turbine of the exhaust-gas turbocharger by using a high-pressure exhaust-gas recirculation valve and feeding recirculated exhaust-gas downstream of the compressor of the exhaust-gas turbocharger as a high-pressure exhaust-gas recirculation mass flow into the fresh-air system.

14. The method according to claim 13, which comprises feeding the high-pressure exhaust-gas recirculation mass flow downstream of a charge-air cooler into the fresh-air system.

15. The method according to claim 13, which comprises cooling the high-pressure exhaust-gas recirculation mass flow prior to feeding the high-pressure exhaust-gas recirculation mass flow into the fresh-air system.

16. The method according to claim 11, which comprises:

measuring a pressure difference across the low-pressure exhaust-gas recirculation valve; and actuating at least one of the low-pressure exhaust-gas recirculation valve and the exhaust-gas flap in dependence of the pressure difference across the low-pressure exhaust-gas recirculation valve.

17. The method according to claim 11, which comprises measuring a temperature of the low-pressure exhaust-gas recirculation mass flow downstream of the low-pressure exhaust-gas recirculation valve.

18. The method according to claim 11, which comprises:

calculating a low-pressure exhaust-gas mass flow by using an ascertained differential pressure across the low-pressure exhaust-gas recirculation valve; and determining, from the low-pressure exhaust-gas mass flow, a volume flow through a particulate filter disposed in the exhaust-gas system.

19. The method according to claim 18, which comprises determining, from the volume flow through the particulate filter, a loading of the particulate filter.

20. The method according to claim 11, which comprises cooling the low-pressure exhaust-gas recirculation mass flow prior to feeding the low-pressure exhaust-gas recirculation mass flow into the fresh-air system.

21. The method according to claim 11, which comprises using, as the internal combustion engine, one of a diesel engine and an otto-cycle engine.

* * * * *